(12) United States Patent
Holmes

(10) Patent No.: US 7,594,869 B2
(45) Date of Patent: Sep. 29, 2009

(54) TORQUE-TRANSMITTING ASSEMBLY WITH DOG CLUTCH AND HYDROSTATIC DAMPER AND ELECTRICALLY VARIABLE TRANSMISSION WITH SAME

(75) Inventor: Alan G. Holmes, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 424 days.

(21) Appl. No.: 11/669,246

(22) Filed: Jan. 31, 2007

(65) Prior Publication Data
US 2008/0182693 A1 Jul. 31, 2008

(51) Int. Cl.
F16H 3/72 (2006.01)
F16D 23/00 (2006.01)

(52) U.S. Cl. .................... 475/5; 192/55.4
(58) Field of Classification Search ............. 192/55.4, 192/53.34, 208
See application file for complete search history.

(56) References Cited

U.S. PATENT DOCUMENTS

| 6,478,705 | B1 * | 11/2002 | Holmes et al. | ........ 475/5 |
| 6,540,631 | B2 | 4/2003 | Holmes | |
| 6,551,208 | B1 | 4/2003 | Holmes et al. | |
| 2008/0176695 | A1 * | 7/2008 | Janson et al. | ........ 475/5 |

* cited by examiner

*Primary Examiner*—Dirk Wright

(57) ABSTRACT

A torque-transmitting assembly is provided that includes a dog clutch isolated by a device such as a rotary hydrostatic damper from relative loading on the torque input member and torque output member that it is to connect for common rotation and torque transmission. Although its use is not limited to electrically-variable transmissions, the torque transmitting assembly is able to function even with the large inertia and potentially random torque inputs associated with theses types of transmissions.

12 Claims, 3 Drawing Sheets

TORQUE-TRANSMITTING ASSEMBLY WITH DOG CLUTCH AND HYDROSTATIC DAMPER AND ELECTRICALLY VARIABLE TRANSMISSION WITH SAME

TECHNICAL FIELD

The invention relates to a torque-transmitting assembly with a dog clutch and a hydrostatic damper that may be used in an electrically variable transmission to transmit torque.

BACKGROUND OF THE INVENTION

A dog clutch is engaged to transmit torque by moving two sets of teeth together to intermesh with one another. A dog clutch may be engaged in a random combination of positions as both sets of teeth circumscribe two rotating shafts that are to be brought together for common rotation by engagement of the clutch. If the teeth are not closely set, there will be a significant amount of uncontrolled motion in the clutch when it is engaged, creating noise in a drivetrain utilizing the clutch. Therefore, in order to minimize the amount of uncontrolled motion when the dog clutch is engaged, the two sets of teeth should be closely set relative to one another when the dog clutch is engaged. This requires that the two sides of the dog clutch be very nearly aligned with one another and therefore synchronized, i.e., turning at the same speed, for engagement to be successful.

Manual transmissions typically have a plate clutch that releases the transmission input shaft from the engine when disengaged. A dog clutch with one side (i.e., one of the sets of teeth) connected to the transmission input shaft then has only a few components connected thereto, and therefore a relatively small amount of inertia and resistance to rotational movement. This allows a synchronizer to be employed to synchronize that side of the dog clutch to rotate at the same speed as the other side of the dog clutch, allowing for smooth and reliable engagement of the dog clutch.

The implementation of dog clutches in other types of transmissions, such as electrically-variable transmissions, has thus far been prevented because relatively heavy components, such as a motor/generator with its relatively large inertia, would be connected to either side of the dog clutch. Additionally, in a vehicle with an electrically-variable transmission, the side of the dog clutch operatively connected to the wheels on a vehicle would sometime be subjected to strong random torque inputs when the vehicle is riding over a bumpy surface. Typical synchronizers would not be able to synchronize the speeds of both sides of the dog clutch under such conditions.

SUMMARY OF THE INVENTION

A torque-transmitting assembly is provided that includes a dog clutch isolated by a rotary hydrostatic damper from relative loading on a torque input member and a torque output member that it connects for common rotation and torque transmission. Although its use is not limited to electrically-variable transmissions, the torque transmitting assembly is able to function even with the large inertia and potentially random torque inputs associated with theses types of transmissions.

More specifically, the torque-transmitting assembly includes a selectively engagable dog clutch in series with a rotary hydrostatic damper. The dog clutch has first and second rotatable components that are selectively engagable with one another to transmit torque from a torque input member to a torque output member. The hydrostatic damper is operatively connected mechanically in series with the dog clutch between the torque input member and the torque output member (i.e., on one side of the dog clutch). The damper dampens random torque inputs to provide a variable resistance to relative rotation of the first and second components of the dog clutch. That is, the resistance to engagement of the dog clutch is dependent only on the damper, and is preferably unaffected by loading of the torque input and output members.

In one embodiment, the hydrostatic damper has two rotatable members that are relatively rotatable with respect to one another over a range of less than one rotation (e.g., approximately 180 degrees). Preferably, hydrostatic fluid between the two rotatable members may be varied in volume to control the resistance to relative rotation of the members. It is also preferable that a spring is connected between the two members to urge them to a substantially centered orientation within the range of permitted relative rotation, so that equal rotation in either direction will be possible in response to a random torque component.

Within the scope of the invention, a synchronizer may be utilized between the two rotatable components of the dog clutch to synchronize these components of the dog clutch prior to engagement of the dog clutch teeth. Specifically, the synchronizer has a cone and blocking teeth, and is alignable for common rotation with the first rotatable component when the cone causes the synchronizer to rotate at the same speed as the second rotatable member of the dog clutch to which it is axially adjacent. In this state, the blocking teeth are aligned with the first set of dog clutch teeth, which are internal teeth on the first rotatable component. The first rotatable component of the dog clutch with the first set of dog clutch teeth thereon are thus blocked from engagement with the second set of teeth at this point, until a spring biases the first rotatable component and the synchronizer to a slightly rotated position relative to one another in which the blocking teeth are out of the way of the first set of teeth (i.e., blocking teeth are no longer aligned with the first set of teeth). The first rotatable component may then continue to move axially toward the second rotatable component, under the control of a controller, while maintaining engagement with the second rotating member of the damper, so that the first set of teeth engage with the second set of teeth.

In another embodiment, the controllable rotary hydrostatic damper partially defines a cavity housing a variable displacement pump. The pump is connected for rotation with the torque input member. The damper is expandable by increasing hydraulic pressure to axially displace the first rotatable component of the dog clutch into engagement with the second rotatable component of the dog clutch, thereby transferring torque from the torque input member to the torque output member. Pumped fluid within the damper dampens any random torque inputs, allowing for a relatively smooth and reliable engagement. The damper is at a minimum volume when the dog clutch is disengaged, so its resistance to rotation is also at a minimum, allowing the two sets of teeth to align and the dog clutch to close. As the dog clutch engages, the damper volume and resistance to rotation increase.

The torque-transmitting assembly may be used in an electrically-variable transmission between a transmission input member and a transmission output member. The dog clutch may be engaged to change an operating mode of the transmission, preferably with the engagement not being dependent on loading of the transmission input member and output member due to the damping function of a device such as a hydrostatic damper as described above. (As used herein, a "mode" or an "operating mode" is a particular operating state, whether encompassing a continuous range of speed ratios or only a fixed speed ratio, achieved by engagement of a particular torque-transmitting mechanism or torque-transmitting mechanisms.) The shift may be from an input-split mode to a compound-split mode. Preferably, a friction-based torque-transmitting mechanism is released when the dog clutch is engaged to shift between the two operating modes.

In one embodiment, the electrically-variable transmission has two motor/generators and two differential gear sets, which are preferably planetary gear sets, each having first, second and third members. The transmission input member is continuously connected for common rotation with the first member of the first planetary gear set. The second member of the first planetary gear set and the first member of the second planetary gear set are connected for common rotation with the transmission output member. The first motor/generator is connected for common rotation with the third member of the first planetary gear set. The second motor/generator is connected for common rotation with the second member of the second planetary gear set. A friction brake is selectively engagable to ground the third member of the second planetary gear set to a stationary member, thereby establishing an input-split mode of operation. The dog clutch is selectively engagable to connect the third member of the first planetary gear set for common rotation with the third member of the second planetary gear set, thereby establishing a compound-split mode of operation.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
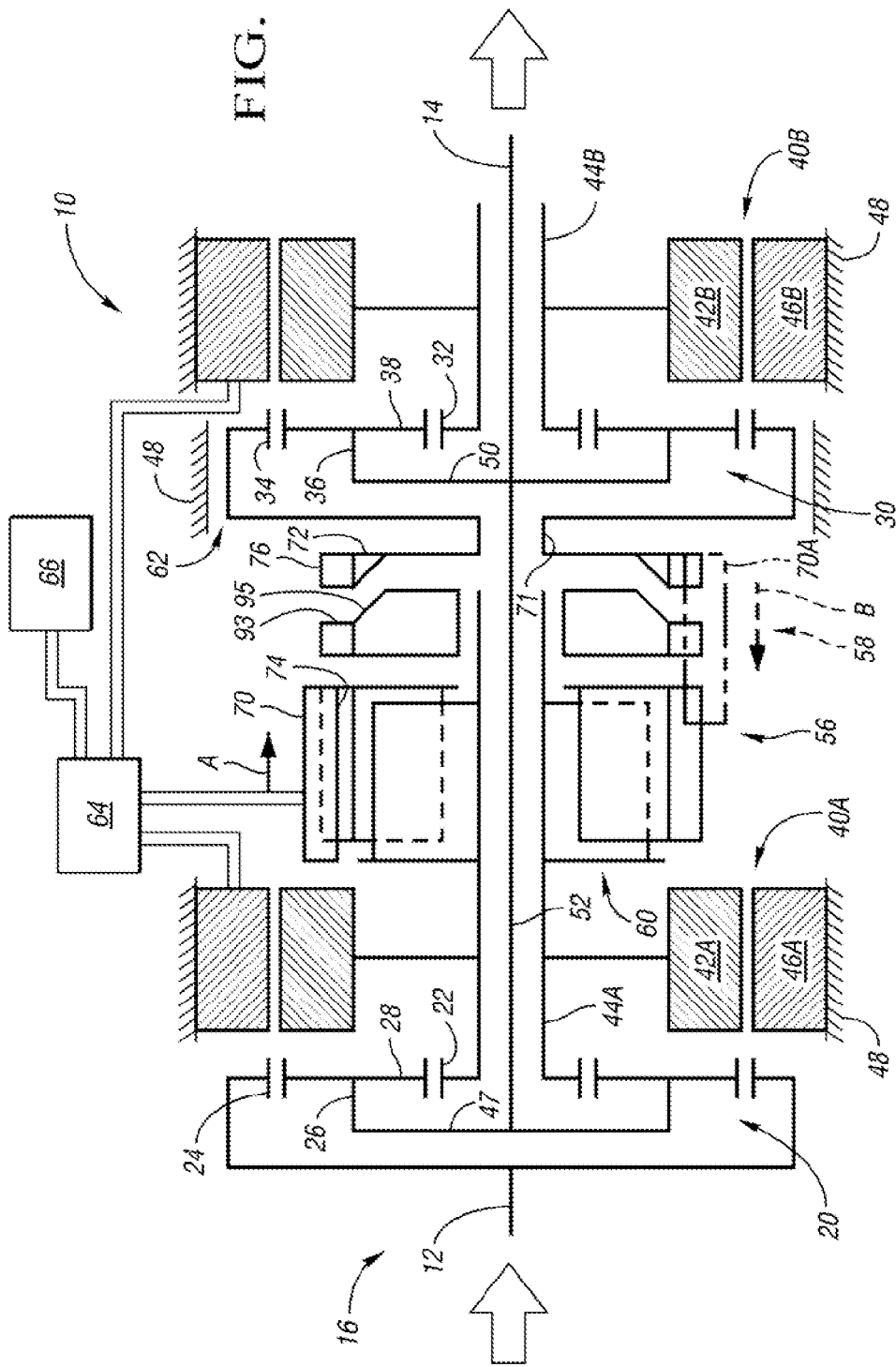
FIG. 1 is a schematic cross-sectional illustration of an electrically variable transmission including a torque-transmitting assembly with a rotary hydrostatic damper and a dog clutch.

Referring to the drawings, wherein like reference numbers refer to like components, FIG. 1 shows an electrically-variable transmission 10 with a transmission input member 12 and a transmission output member 14. The transmission 10 includes a transmission gearing arrangement 16. The transmission gearing arrangement has first and second differential gear sets, which in this embodiment are planetary gear sets 20, 30. The planetary gear set 20 includes a sun gear member 22, a ring gear member 24 and a carrier member 26 that rotatably supports planet gears 28 that intermesh with both the sun gear member 22 and the ring gear member 24. The second planetary gear set 30 includes a sun gear member 32, a ring gear member 34 and a carrier member 36 that rotatably supports planet gears 38 that intermesh with both the sun gear member 32 and the ring gear member 34.

The transmission 10 further includes a first motor/generator 40A and a second motor/generator 40B. The first motor/generator 40A includes a rotor 42A that is operatively connected for common rotation with the sun gear member 22 via a sleeve shaft 44A and a stator 46A that is grounded to a stationary member 48, such as a housing or casing of the transmission 10. The second motor/generator 40B includes a rotor 42B that is operatively connected for common rotation with the sun gear member 32 via a sleeve shaft 44B and a stator 46B that is grounded to the stationary member 48.

The transmission input member 12 is connected for common rotation with the ring gear member 24. The carrier member 26 is connected for common rotation with the carrier member 36 via hubs 47 and 50 as well as intermediate shaft 52. The intermediate shaft 52 rotates commonly with, and may be integral with the transmission output member 14.

The transmission 10 has two selectively engagable torque-transmitting mechanisms. The first is a torque-transmitting assembly 56 that has a dog clutch 58 in series with a rotary hydrostatic damper 60. The second is a friction-based torque-transmitting mechanism, brake 62, selectively engagable to ground the ring gear member 34 to the stationary member 48. (A friction-based rotary clutch could be used within the scope of the invention, but a brake is preferred, for the reasons set forth below.) The use of a friction brake 62 and a dog clutch 58 increases the efficiency of the electrically-variable transmission 10, as both of these torque-transmitting mechanisms may be engaged with relatively low power and losses in comparison with rotating friction clutches. Rotating friction clutches typically require either a strong spring and throw out bearing, such as on a manual transmission, or a rotating hydraulic seal and a high pressure oil supply, such as on an automatic transmission, both of which have high associated energy losses due to increased friction and the need for pumping power, respectively. The dog clutch 58 requires only a low pressure oil to actuate, (either by piston or fork, as described in the embodiments below) and low pressure oil is already necessary in the electrically variable transmission to lubricate the gears in the transmission gearing arrangement 16.

Figure 2:
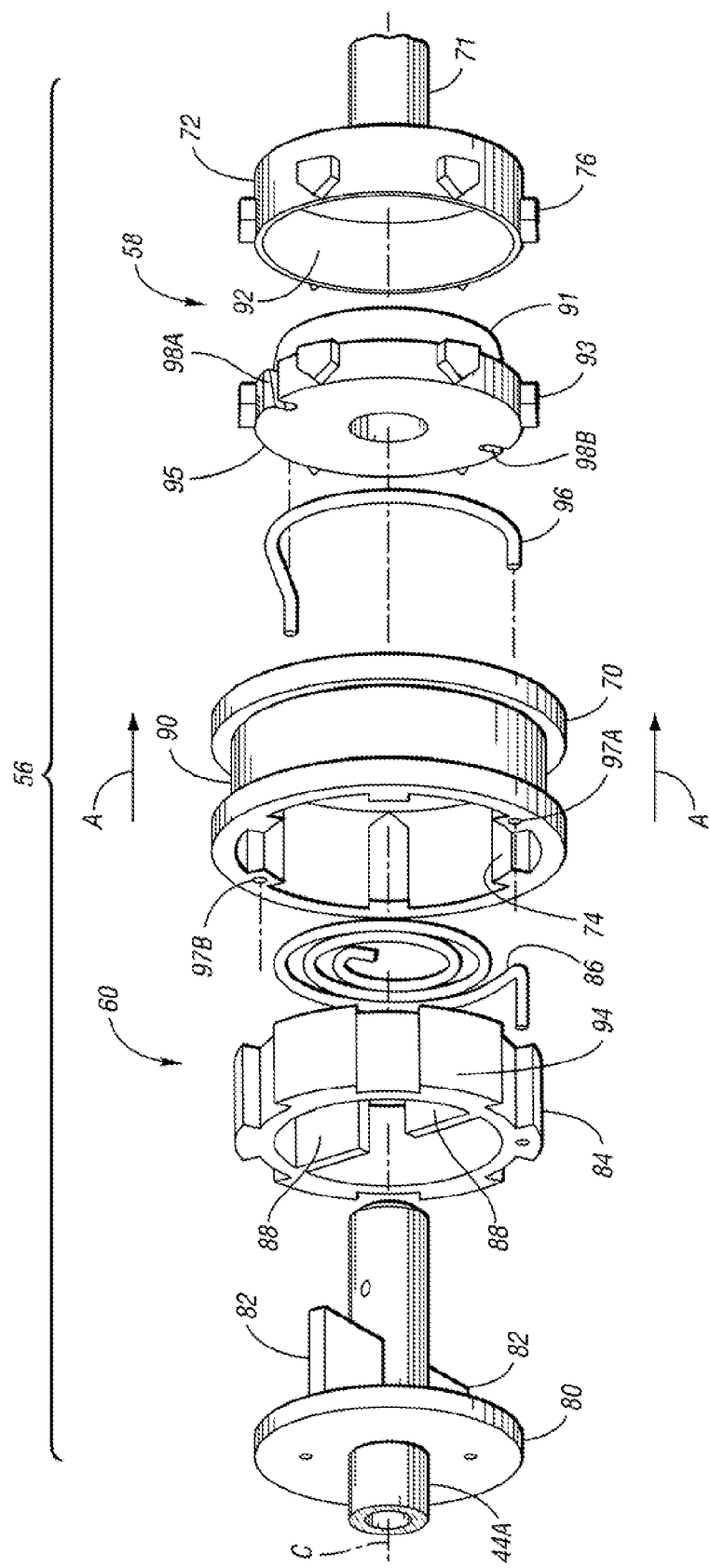
FIG. 2 is a perspective exploded view of the torque-transmitting assembly used in the electrically-variable transmission of FIG. 1.

A controller 64 controls power flow between an electric storage device 66 (such as a battery) and the respective motor/generators 40A, 40B to control their respective functioning as a motor or as a generator, as is understood by those skilled in the art. The controller 64 also controls the torque-transmitting assembly 56 to selectively engage the dog clutch 58, as will be discussed in greater detail below. Specifically, the controller 64 controls the torque-transmitting assembly 56 to cause axial motion of a rotatable component 70 of the dog clutch 58, causing a set of teeth 74 on the first rotatable component 70 (the first set of teeth) to engage with a set of teeth 76 on a second rotatable component 72 (the second set of teeth) of the dog clutch 58. In this embodiment, a synchronizer 95 with blocking teeth 93 allows for smooth engagement of the dog clutch 58, as will be described in more detail with respect to FIG. 2. The first rotatable component 70 is annular, as illustrated in FIG. 2. However, in FIG. 1, the cross-sectional view of the first rotatable component, a top section is shown representing a disengaged position in which the first rotatable component is referred to as 70, while a bottom section is shown representing an alternate engaged position, in which the first rotatable component is referred to as 70A. Thus, to engage, the first rotatable component 70 moves in the direction of arrow A, while to disengage the first rotatable component 70A moves in the direction of arrow B. It should be appreciated that the entire first rotatable component is either in the engaged position (represented by 70A) or the disengaged position (represented by 70), and the top and bottom sections are not independently movable with respect to one another.

Those skilled in the art will readily recognize that engagement of the friction brake 62 while the dog clutch 58 remains disengaged establishes an input-split mode of operation. Disengaging the friction brake 62 and engaging the dog clutch 58 shifts from the input-split mode of operation to a compound-split mode of operation. By utilizing the torque-transmitting assembly 56, as more specifically described with respect to FIG. 2, or the alternative torque-transmitting assembly 156 described with respect to FIG. 3, the shift from the input-split mode to the compound-split mode can be synchronous, as the hydrostatic damper 60 is able to dampen random differences in speed between a sleeve shaft 44A and a sleeve shaft 44B (which may be considered the torque input member and the torque output member, in either order) of the torque-transmitting assembly 56. The load (i.e., torque) differentials or random differences in speeds experienced by the respective sleeve shafts 44A, 44B correspond with random load differentials experienced by the transmission input member 12 and the transmission output member 14. By isolating the load and/or speed differentials in the hydrostatic damper 60, the sets of teeth 74, 76 of the dog clutch 58 may be engaged due to axial motion of the first rotatable component 70 (indicated by arrow A in FIG. 1), with relatively little resistance to engagement even though the resistance to relative rotation of the shafts 44A and 71 (which rotates commonly with second rotatable component 72) may be high, as the transmission 10 may be relatively stiff (dynamically) in torsion.

Referring now to FIG. 2, the torque-transmitting assembly 56 of FIG. 1 is shown in greater detail. The damper 60 has a first rotatable member 80 that rotates commonly with the sleeve shaft 44A. A pair of external vanes 82 extends in a common plane from the first rotatable member 80, intersecting an axis of rotation C of the sleeve shaft 44A. The damper 60 further includes a second rotatable member 84 through which the sleeve shaft 44A extends. A centering torsion spring 86 connects at one end to the second rotatable member 84 and at another end through the sleeve shaft 44A. A pair of opposed internal vanes 88 extend inward into a hollow center of the second rotatable member 84. The spring 86 mounts the second rotatable member 84 to the sleeve shaft 44A and is pretensioned to urge the second rotatable member 84 into the substantially centered orientation shown with respect to the first rotatable member 80, in which the vanes 82 and 88 are roughly perpendicular, allowing relative rotation of the second rotatable member 84 with respect to the first rotatable member 80 in approximately ninety degrees in either direction over a total range of approximately one hundred-eighty degrees.

The torque-transmitting assembly 56 includes a synchronizer 95 that has external blocking teeth 93 and a cone 91. The cone 91 is adjacent a cavity 92 in the second rotatable component 72 that is configured to receive the cone 91. The first rotatable component 70 (which may be referred to as a collar) includes the first set of teeth 74, which are internal teeth continuously engaged with external teeth 94 on the second rotatable member 84 of the damper 60. A groove 90 in the first rotatable component 70 receives a fork (not shown) that is moved by a controller (such as controller 64 or FIG. 1) to axially slide the first rotatable component 70 to the right. The axial movement is small enough so that the teeth 74 remain engaged with the teeth 94 and the second rotatable member 84 continues to rotate commonly with the first rotatable component 70. A controller slides the first rotatable component 70 in this manner when the synchronizer cone 91 (and the first rotatable component 70) are turning at the same speed as the second rotatable component 72 of the dog clutch 58, as indicated by sensors operatively connected with the first and second rotatable members 70, 72 of the dog clutch 58.

A first spring 96 has one end held in an opening 97A in the first rotatable component 70 and another end twisted to lie in a ramped slot 98A of the synchronizer 95. Another opening 97B and ramped slot 98B similarly receive a second, like spring (not shown). The ramped nature of the slots 98A and 98B allow the first spring 96 (and second spring) to be nested in the slots when the first rotatable component 70 moves to the right to engage the second rotatable component 72. The spring 96 presses the cone 91 into the cavity 92 with a light force to begin to synchronize the speeds of the synchronizer 95 and the second rotatable component 72. This interaction between the cone 91 and the cavity 92 slightly rotates the synchronizer 95 relative to the first rotatable component 70, to the extent permitted by the spring 96, to align the blocking teeth 93 with the internal teeth 74, thus blocking engagement of the internal teeth 74 with the external teeth 76. Once the synchronizer 95 and the second rotatable component 72 are rotating at the same speed, the spring force of the spring 96 rotates the synchronizer slightly relative to the first rotatable component 70 to move the blocking teeth out of the way of the internal teeth 74 to allow the first rotatable component to move further axially and the internal teeth 74 to then engage the external teeth 76. Thus, by controlling the first rotatable component 70 to slide and cause engagement of the dog clutch 58 only when the speeds of the first and second rotatable components 70, 72 are the same, synchronized engagement is accomplished, while the one hundred-eighty degree range of motion or "play" between the first and second rotatable members 80, 84 of the damper 60 absorbs any small amount of random motion between the two shafts 44A, 71.

Figure 3:
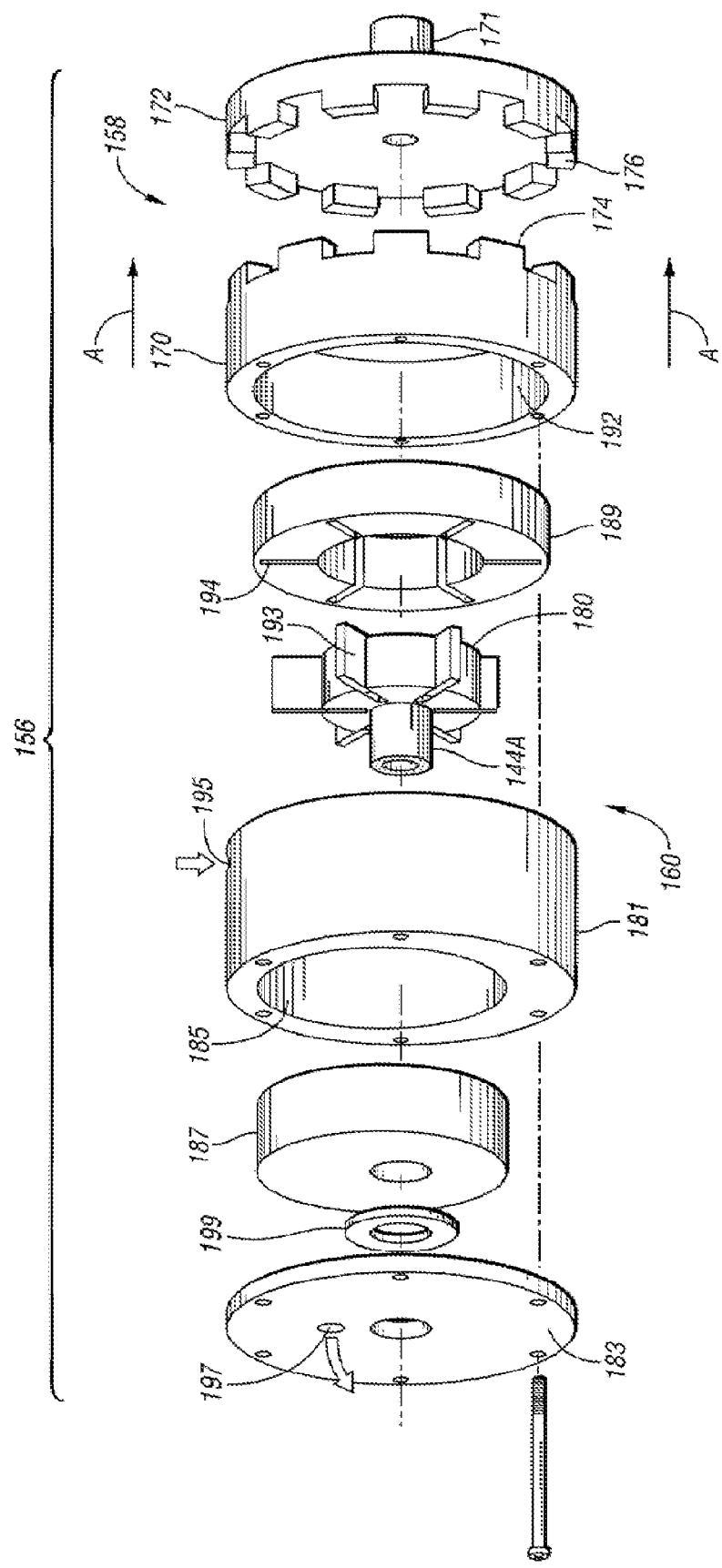
FIG. 3 is a perspective exploded view of an alternative embodiment of a torque-transmitting assembly that may be used in the electrically-variable transmission of FIG. 1.

Referring to FIG. 3, an alternative embodiment of a torque-transmitting assembly 156 is depicted that may be used in place of torque-transmitting assembly 56 in the electrically-variable transmission 10 of FIG. 1. The torque-transmitting assembly 156 includes a dog clutch 158 and a variable displacement rotary hydrostatic damper 160 capable of continuous rotation (i.e. without being limited in its angle of rotation) when the dog clutch 158 is disengaged. The dog clutch 158 has a first rotatable component 170 with a first set of teeth 174 that are selectively engagable with a second set of teeth 176 on a second rotatable component 172 of the dog clutch 158. The second rotatable component 172 rotates commonly with shaft 171, which would be identical in location to sleeve shaft 71 in the electrically variable transmission 10 FIG. 1.

The damper 160 includes a hub 180 connected for rotation with shaft 144A, which would be identical in location to sleeve shaft 44A in the electrically-variable transmission 10 of FIG. 1. A casing 181 surrounds the hub 180 and is closed on one end by an end cover 183 and on an opposing end by the first rotatable component 170 of the dog clutch 158. A spacer 187 fits within an eccentric circular or oval cavity 185 formed through the casing 181 and is held in a definite axial position along shaft 144A by a retaining collar 199, which is press fit securely onto shaft 144A but which allows the spacer 187 to rotate freely with respect to the shaft 144A. The shaft 144A extends through aligned openings in the end cover 183 and the spacer 187. A containing ring 189 is free to rotate within a hollowed opening 192 in the first rotatable component 170. The hollowed opening 192 does not extend completely through the first rotatable component 170, so that the first rotatable component 170 serves, along with the end cover 183, to close off the cavity 185 when the torque-transmitting assembly 156 is assembled.

When the dog clutch 158 is disengaged, spacer 187 is positioned flush with the right end of the casing 181 and the hub 180 is positioned in the containing ring 189 in the hollowed opening 192, with pump vanes 193 held almost entirely within receiving slots 194 in the containing ring 189. A small amount of each pump vane 193, along its left edge, is held within the eccentric or oval cavity 185 in the casing 181, to hold the pump vane 193 in the correct position for engagement of the dog clutch 158. This position of the vanes 193 just slightly within the cavity 185, and with the spacer 187 very close to the containing ring 189, defines the minimum displacement for the rotary hydraulic damper 160. In this position, the damper 160 can produce almost no torque, so the first rotatable component 170, the casing 185, the spacer 187 and the end cover 183 can rotate almost freely with respect to the containing ring 189, the pump vanes 193, the hub 180, the shaft 144A, and the retaining collar 199.

To engage the dog clutch 158, oil is fed through an opening 195 in the casing 181. The oil flows between the right side of the casing 181 and the spacer 187 and the left side of the containing ring 189, creating hydraulic pressure that moves the containing ring 189, the first rotatable component 170, the casing 181 and the end cover 183 to the right with respect to the spacer 187 and the hub 180, to engage the teeth 174 and 176 of the dog clutch 158. Thus, the oil drives the containing ring 189 apart from the spacer 187, expanding oil chambers contained within the cavity 185 of the casing 181 between the spacer 187 and the ring 189. This axial movement increases the displacement within the expanding oil chambers which are each defined by the hub 180, the casing 181, the vanes 193, the spacer 187 and the ring 189. Thus, the stiffness of the damper 160 (i.e., its ability to transmit torque), which is dependent on the displacement of the chambers, is integral with the axial movement of the first rotatable component 170 and the attached components (i.e., the containing ring 189, the casing 181 and the end cover 183). These axially-movable components function as a hydraulic piston in response to the rising hydraulic pressure. When the dog clutch 158 is engaged, the casing 181 has moved axially to the right relative to the spacer 187 so that the retaining collar 199 is at the left end of the casing, against the end cover 183 at full engagement. Oil is allowed to escape from this side of the cavity 185 through an opening 197. To disengage the dog clutch 158, oil is pumped into opening 197 in the end cover 183 and allowed to escape through opening 195 from among the pump vanes, to easily disengage the clutch 158 by moving end cover 183, the casing 181, and the first rotatable component 170 back to the left. Pump vanes 193 are kept in alignment with the cuts in the ring 189 by the relative lengths of the components, so that the vanes 193 are always engaged with the ring 189 by at least a small distance along the axis, even when the clutch is fully engaged.

It should be appreciated that the torque-transmitting assemblies of FIGS. 2 and 3 may be used for other torque-transmission purposes than in an electrically-variable transmission and may be used for other electrically-variable transmissions than that depicted in FIG. 1.

While the best modes for carrying out the invention have been described in detail, those familiar with the art to which this invention relates will recognize various alternative designs and embodiments for practicing the invention within the scope of the appended claims.

The invention claimed is:

1. A torque-transmitting assembly for transmitting torque from a torque input member to a torque output member, comprising:
  a dog clutch having a first rotatable component selectively engagable with a second rotatable component to transmit torque from the torque input member to the torque output member; and
  a rotary hydrostatic damper operatively connected mechanically in series with the dog clutch between the torque input member and the torque output member and controllable to provide a variable resistance to relative rotation of the first and second components of the dog clutch.

2. The torque-transmitting assembly of claim 1, wherein the rotary hydrostatic damper has:
  a first rotatable member;
  a second rotatable member relatively rotatable with respect to the first rotatable member over a range of less than one rotation; and
  a spring connected between and urging the first and second rotatable members of the rotary hydrostatic damper to a predetermined, substantially centered orientation in the range.

3. The torque-transmitting assembly of claim 1, wherein the first rotatable component has a first set of teeth and the second rotatable component has a second set of teeth engagable with the first set of teeth; wherein the rotary hydrostatic damper has a first rotatable member and a second rotatable member relatively rotatable with respect to the first rotatable member; wherein the first rotatable component is continuously engaged for common rotation with the second rotatable member; and further comprising:
  a synchronizer positioned between the first and second rotatable components and operable to synchronize the speeds thereof and having a cone and blocking teeth; and wherein the first rotatable component is controllable to move axially while maintaining engagement with the second rotatable member when the speeds of the first and second rotatable components are synchronized to thereby engage the dog clutch.

4. The torque-transmitting assembly of claim 1, wherein the rotary hydrostatic damper has a variable displacement pump connected for rotation with the torque input member and partially defines a cavity housing the variable displacement pump; and wherein the damper is expandable by controlled hydraulic pressure to displace the first rotatable component of the dog clutch axially, thereby selectively engaging the first and second sets of dog clutch teeth.

5. The torque-transmitting assembly of claim 1, in combination with an electrically variable transmission having a transmission input member and a transmission output member; wherein the torque-transmitting assembly is connected between the transmission input member and the transmission output member; wherein the dog clutch is selectively engagable to provide a change in operating mode of the transmission; and wherein engagement of the dog clutch is unaffected by loading of the transmission input member and the transmission output member.

6. A transmission comprising:
  a transmission input member;
  a transmission output member;
  a transmission gearing arrangement operatively connecting the transmission input member with the transmission output member;
  a motor/generator operatively connected to the transmission gearing arrangement for providing power thereto or receiving power therefrom such that the transmission is an electrically variable transmission;
  a dog clutch operatively connected with the transmission gearing arrangement and selectively engagable to transmit torque from the transmission input member to the transmission output member; and a hydrostatic damper operatively connected with the dog clutch to dampen variations between the input member and the output member.

7. The transmission of claim 6, further comprising:
a friction-based torque-transmitting mechanism operatively connected with the transmission gearing arrangement and selectively engagable to transmit torque from the transmission input member to the transmission output member to establish a first mode of operation between the input member and the output member; wherein engagement of the dog clutch establishes a second mode of operation between the input member and the output member; and
wherein a shift between the first mode and the second mode is by synchronously releasing the friction-based torque-transmitting mechanism and engaging the dog clutch via the hydrostatic damper.

8. The transmission of claim 7, wherein the first rotatable component has a first set of teeth and the second rotatable component has a second set of teeth engagable with the first set of teeth; and further comprising:
a second motor/generator; wherein the transmission gearing arrangement has first and second differential gear sets each having a first, a second and a third member; wherein the transmission input member is connected for common rotation with the first member of the first planetary gear set;
wherein the transmission output member is connected for common rotation with the second member of the first planetary gear set and with the first member of the second planetary gear set;
wherein the motor/generator is a first motor/generator and is operatively connected with the third member of the first planetary gear set and with the one of the sets of teeth of the dog clutch; wherein the second motor/generator is connected for common rotation with the second member of the second planetary gear set; wherein the third member of the second planetary gear set is connected for common rotation with the other of the sets of teeth of the dog clutch; and
wherein the friction-based torque-transmitting mechanism is selectively engagable to ground the third member of the second planetary gear set with a stationary member.

9. The transmission of claim 7, wherein said first mode is an input-split mode and wherein said second mode is a compound-split mode.

10. The transmission of claim 6, wherein the motor/generator is connected for rotation with one of the sets of dog clutch teeth.

11. An electrically variable transmission comprising:
a transmission input member;
a transmission output member;
first and second motor/generators;
first and second planetary gear sets, each having a first member, a second member and a third member;
a dog clutch selectively engagable to transmit torque from the transmission input member to the transmission output member;
a device operatively connected with the dog clutch to suppress variations between the input member and the output member;
a selectively engagable friction brake;
wherein the input member is continuously connected for common rotation with the first member of the first planetary gear set; wherein the second member of the first planetary gear set and the first member of the second planetary gear set are connected for common rotation with the transmission output member; wherein the first motor/generator is connected for common rotation with the third member of the first planetary gear set; wherein the second motor/generator is connected for common rotation with second member of the second planetary gear set;
wherein said friction brake is selectively engaged to ground the third member of the second planetary gear set to a stationary member, thereby establishing an input-split mode of operation; and
wherein the dog clutch is selectively engaged to connect the third member of the first planetary gear set for common rotation with the third member of the second planetary gear set, thereby establishing a compound-split mode of operation.

12. The electrically variable transmission of claim 11, wherein the first, second and third members of the first planetary gear sets are a ring gear member, a carrier member and a sun gear member, respectively; and wherein the first, second and third members of the second planetary gear set are a carrier member, a sun gear member and a ring gear member, respectively.

* * * * *